(12) United States Patent
Cok et al.

(10) Patent No.: US 7,274,346 B2
(45) Date of Patent: Sep. 25, 2007

(54) UNIFORMITY AND BRIGHTNESS MEASUREMENT IN OLED DISPLAYS

(75) Inventors: Ronald S. Cok, Rochester, NY (US); James H. Ford, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 623 days.

(21) Appl. No.: 10/858,260

(22) Filed: Jun. 1, 2004

(65) Prior Publication Data

US 2005/0264149 A1    Dec. 1, 2005

(51) Int. Cl.
   *G09G 3/32*    (2006.01)
(52) U.S. Cl. ........................................... 345/82
(58) Field of Classification Search ............... 345/82, 345/76, 98, 100, 204, 107, 206, 420, 99, 345/89, 87, 88, 94, 1.1, 690; 313/495, 497, 313/504, 506, 510, 587, 582, 105 R
   See application file for complete search history.

(56) References Cited

U.S. PATENT DOCUMENTS

| | | | | |
|---|---|---|---|---|
| 4,182,968 A | * | 1/1980 | Keneman et al. | 313/105 R |
| 5,497,171 A | * | 3/1996 | Teres et al. | 345/43 |
| 5,793,221 A | | 8/1998 | Aoki | |

(Continued)

FOREIGN PATENT DOCUMENTS

JP    08/327496    12/1996

(Continued)

OTHER PUBLICATIONS

W. K. Pratt, R. A. Pendergrass, S. S. Sawkar; "P-4: Defect Detection In Reflective Liquid-Crystal Microdisplays"; 1999 SID International Symposium Digest Of Technical Papers; vol. 30; May 18, 1999; pp. 468-471.

*Primary Examiner*—Bipin Shalwala
*Assistant Examiner*—Prabodh Dharia
(74) *Attorney, Agent, or Firm*—Andrew J. Anderson

(57) ABSTRACT

A detection system for the detection of brightness and uniformity variations in an OLED display, comprising: a two-dimensional OLED display having a pre-defined group of light-emitting elements distributed across the display; a two-dimensional imager; optical elements arranged so that the imager is exposed to all of the light-emitting elements in the predefined group of light-emitting elements of the OLED display simultaneously and at a magnification such that each light-sensitive sensor element records the light output from no more than one light-emitting element; and a controller to control the OLED display and cause each of the light-emitting elements of the predefined group of light-emitting elements to illuminate and the imager to acquire images of the illuminated light-emitting elements in the OLED display. The invention is further directed towards a method for the measurement of brightness and uniformity variations in light-emitting elements of an OLED display.

12 Claims, 9 Drawing Sheets

U.S. PATENT DOCUMENTS

| | | | |
|---|---|---|---|
| 5,842,762 A * | 12/1998 | Clarke | 353/122 |
| 6,081,073 A | 6/2000 | Salam | |
| 6,414,661 B1 | 7/2002 | Shen et al. | |
| 6,473,065 B1 | 10/2002 | Fan | |
| 6,498,592 B1 * | 12/2002 | Matthies | 345/1.1 |
| 6,897,855 B1 * | 5/2005 | Matthies et al. | 345/204 |
| 7,053,544 B2 * | 5/2006 | Kijima et al. | 313/495 |
| 2004/0150590 A1 * | 8/2004 | Cok et al. | 345/76 |
| 2004/0155574 A1 * | 8/2004 | Lai et al. | 313/504 |
| 2005/0078104 A1 * | 4/2005 | Matthies et al. | 345/204 |
| 2005/0134525 A1 * | 6/2005 | Tanghe et al. | 345/1.1 |
| 2005/0168142 A1 * | 8/2005 | Murakami et al. | 313/506 |
| 2005/0168491 A1 * | 8/2005 | Takahara et al. | 345/690 |
| 2006/0061248 A1 * | 3/2006 | Cok et al. | 313/110 |
| 2006/0077136 A1 * | 4/2006 | Cok | 345/76 |
| 2006/0125734 A1 * | 6/2006 | Cok et al. | 345/76 |

FOREIGN PATENT DOCUMENTS

WO     WO93/19453     9/1993

* cited by examiner

UNIFORMITY AND BRIGHTNESS MEASUREMENT IN OLED DISPLAYS

FIELD OF THE INVENTION

The present invention relates to systems and methods for measuring performance of OLED displays having a plurality of light-emitting elements.

BACKGROUND OF THE INVENTION

Organic Light Emitting Diodes (OLEDs) have been known for some years and have been recently used in commercial display devices. Such devices employ both active-matrix and passive-matrix control schemes and can employ a plurality of light-emitting elements. The light-emitting elements are typically rectangular and arranged in two-dimensional arrays with a row and a column address for each light-emitting element and having a data value associated with the light-emitting element value. However, such displays suffer from a variety of defects that limit the quality of the displays. In particular, OLED displays suffer from non-uniformities in the light-emitting elements. These non-uniformities can be attributed to both the light-emitting materials in the display and, for active-matrix displays, to variability in the thin-film transistors used to drive the light-emitting elements.

A variety of schemes have been proposed to correct for non-uniformities in displays. These schemes generally rely upon first measuring the light output of the light-emitting elements in a display. U.S. Pat. No. 6,081,073 entitled "Matrix Display with Matched Solid-State Pixels" by Salam granted Jun. 27, 2000 describes a display and a video or display camera or a photo-sensor to detect the light output of the LED display in the presence or absence of ambient light. However, no specification for the resolution of the imaging system or the analysis process is provided.

U.S. Pat. No. 6,414,661 B1 entitled "Method and apparatus for calibrating display devices and automatically compensating for loss in their efficiency over time" by Shen et al issued 20020702 describes a method and associated system that compensates for long-term variations in the light-emitting efficiency of individual organic light emitting diodes in an OLED display device by calculating and predicting the decay in light output efficiency of each pixel based on the accumulated drive current applied to the pixel and derives a correction coefficient that is applied to the next drive current for each pixel. This patent describes the use of a camera to acquire images of a plurality of equal-sized sub-areas. Such a process is time-consuming and requires mechanical fixtures to acquire the plurality of sub-area images.

U.S. Pat. No. 6,473,065 B1 entitled "Methods of improving display uniformity of organic light emitting displays by calibrating individual pixel" by Fan issued 20021029 describes methods of improving the display uniformity of an OLED. In order to improve the display uniformity of an OLED, the display characteristics of all organic-light-emitting-elements are measured, and calibration parameters for each organic-light-emitting-element are obtained from the measured display characteristics of the corresponding organic-light-emitting-element. The technique acquires information about each pixel in turn using a photo-detector. However, this technique is very inefficient and slow in a realistic manufacturing environment.

There is a need, therefore, for an improved method of measuring uniformity in an OLED display that overcomes these objections.

SUMMARY OF THE INVENTION

The need is met according to the present invention by providing a detection system for the detection of brightness and uniformity variations in a pre-defined group of light-emitting elements in an OLED display, comprising:

a) a two-dimensional OLED display having a pre-defined group of light-emitting elements distributed across the display comprising up to $N_W$ light-emitting elements in a first dimension and up to $N_H$ light-emitting element in a second dimension orthogonal to the first dimension, each light-emitting element having a light-emitting element width and a separation width from an adjacent light-emitting element in the pre-defined group in the first dimension and a light-emitting element height and a separation height from an adjacent light-emitting element in the pre-defined group in the second dimension, wherein the light emitting elements and separations in the first dimension have a characteristic element width $P_W$ and separation width $S_W$, $P_W$ and $S_W$ being the element width and separation width from an adjacent element in the pre-defined group in the first dimension that provides the largest ratio, and the light emitting elements and separations in the second dimension have a characteristic element height $P_H$ and separation height $S_H$, $P_H$ and $S_H$ being the element height and separation height from an adjacent element in the pre-defined group in the second dimension that provides the largest ratio;

b) a two-dimensional imager with a plurality of light-sensitive sensor elements sensitive to the light emitted by the light-emitting elements, wherein the number of light-sensitive sensor elements in a first dimension of the imager is greater than $2(N_W-1)[(P_W+S_W)/\mathrm{MIN}(P_W,S_W)]$, and the number of light sensitive sensor elements in a second dimension orthogonal to the first dimension of the imager is greater than $2(N_H-1)[(P_H+S_H)/\mathrm{MIN}(P_H,S_H)]$;

c) optical elements arranged so that the imager is exposed to all of the light-emitting elements in the predefined group of light-emitting elements of the OLED display simultaneously and at a magnification such that each light-sensitive sensor element records the light output from no more than one light-emitting element; and d) a controller to control the OLED display and cause each of the light-emitting elements of the predefined group of light-emitting elements to illuminate and the imager to acquire images of the illuminated light-emitting elements in the OLED display.

The invention is further directed towards a method for the measurement of brightness and uniformity variations in light-emitting elements of an OLED display, comprising the steps of:

a) providing a detection system as set forth above;

b) illuminating all of the OLED display light-emitting elements within a pre-defined group distributed across the display;

c) acquiring an image of the OLED display light-emitting elements; and d) processing the image of the OLED display light-emitting elements to provide a measurement of the brightness of each OLED display light-emitting element in the group.

ADVANTAGES

The present invention has the advantage of providing improved efficiency and accuracy in measuring the uniformity of an OLED display.

DETAILED DESCRIPTION OF THE INVENTION

Figure 1:
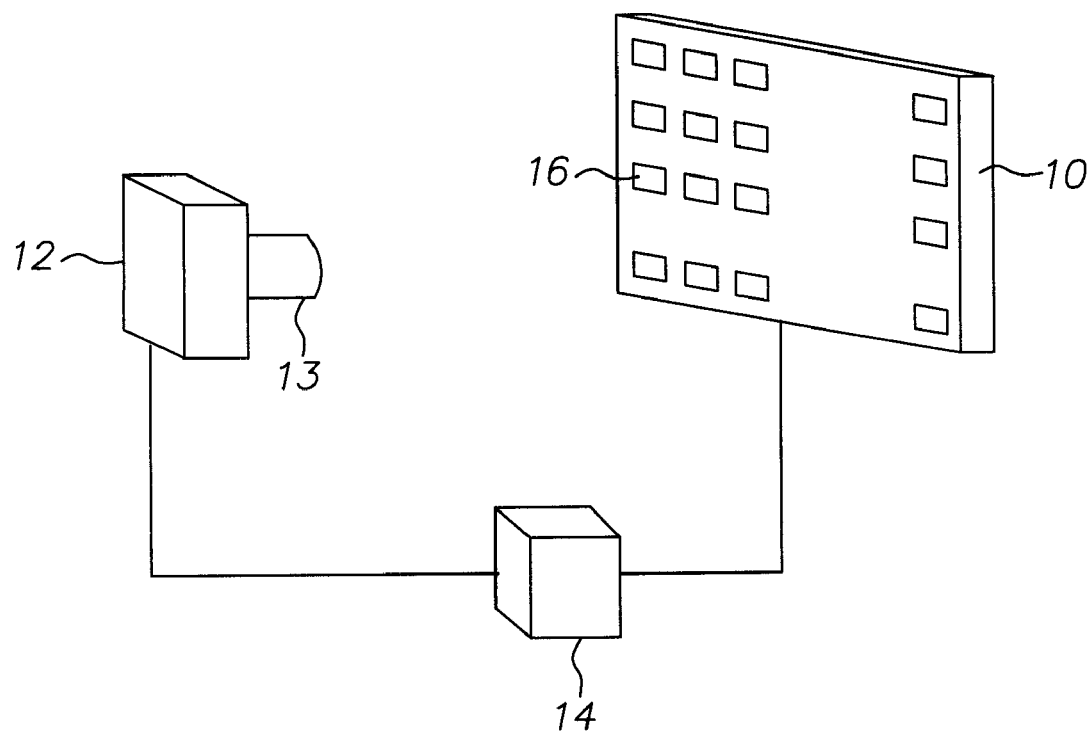
FIG. 1 illustrates a detection system according to one embodiment of the present invention.

Referring to FIG. 1, a detection system for the detection of brightness and uniformity variations in OLED displays, comprises an OLED display 10 comprising a two-dimensional array of light-emitting elements 16. The display comprises a group of light-emitting elements distributed across the display having up to $N_W$ light-emitting elements 16 in a first dimension and up to $N_H$ light-emitting elements 16 in a second dimension orthogonal to the first dimension. $N_W$ and $N_H$ thus represent the maximum number of light-emitting elements 16 in the first and second dimensions, respectively. Each light-emitting element has a light-emitting element width and a separation width from an adjacent light-emitting element in the first dimension and a light-emitting element height and a separation height from an adjacent light-emitting element in the second dimension. The light emitting elements and separations in the first dimension have a characteristic element width $P_W$ and separation width $S_W$, $P_W$ and $S_W$ being the element width and separation width from an adjacent element in the first dimension that provides the largest ratio, and the light emitting elements and separations in the second dimension have a characteristic element height $P_H$ and separation height $S_H$, $P_H$ and $S_H$ being the element height and separation height from an adjacent element in the second dimension that provides the largest ratio. The largest ratio of the element size and separation from an adjacent element is the largest ratio of the element size to separation from an adjacent element, or of separation from an adjacent element to the element size.

FIG. 1 further depicts a two-dimensional imager 12 with a plurality of light-sensitive sensor elements sensitive to the light emitted by the light-emitting elements, wherein the number of light-sensitive sensor elements in a first dimension of the imager is greater than $2(N_W-1)[(P_W+S_W)/\text{MIN}(P_W,S_W)]$, and the number of light sensitive sensor elements in a second dimension orthogonal to the first dimension of the imager is greater than $2(N_H-1)[(P_H+S_H)/\text{MIN}(P_H,S_H)]$. In the above equations, the function MIN returns the minimum value of the function arguments. Optical elements 13 are arranged so that the imager is exposed to all of the light-emitting elements within a group of light-emitting elements distributed across the OLED display simultaneously and at a magnification such that each light-sensitive sensor element records the light output from no more than one light-emitting element. Controller 14 controls the OLED display and causes the light-emitting elements to illuminate and the imager to acquire images of the light-emitting elements in the OLED display. The optics 13 may be an integral component of the imager 12 (for example, a camera lens) or may be separate. The imager 12 may be, e.g., a CCD or CMOS sensor, and may be conveniently incorporated in a digital camera. This arrangement guarantees that light emitted from every light-emitting element in a group of light-emitting elements distributed across the display will be recorded by at least one light-sensitive sensor element, and that the separation spaces between adjacent light-emitting elements in the group is likewise recorded by at least one light-sensitive sensor element.

Figure 2:
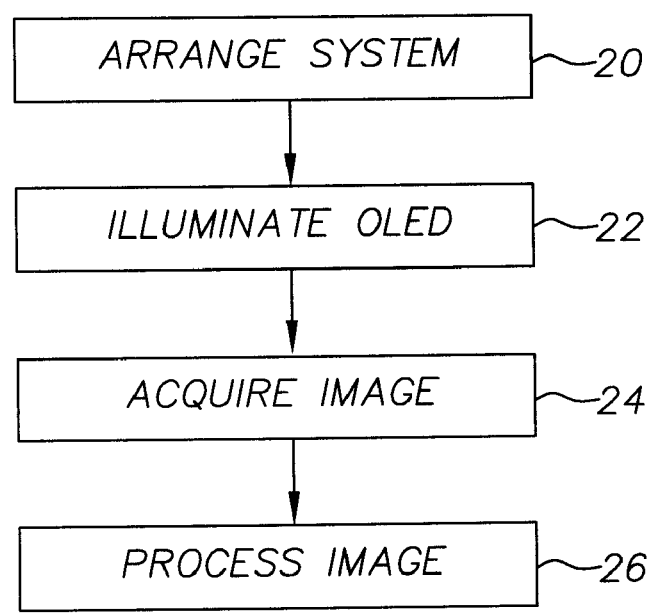
FIG. 2 is a flow diagram illustrating the method of the present invention.

Referring to FIG. 2, the method for the measurement of brightness and uniformity variations in light-emitting elements of an OLED display, comprises the steps of first arranging 20 the imager 12 and optics 13 so that the sensor elements of the imager is exposed to all of the light-emitting elements in a group of light-emitting elements distributed across the OLED display simultaneously and at a magnification such that each light-sensitive sensor element records the light output from no more than one OLED display light-emitting element; illuminating 22 all of the OLED display light-emitting elements within a pre-defined group of light-emitting elements distributed across the display; acquiring 24 an image of the illuminated OLED display light-emitting elements; and processing 26 the image of the OLED display light-emitting elements to provide a measurement of the brightness of each OLED display light-emitting element in the group.

Figure 3:
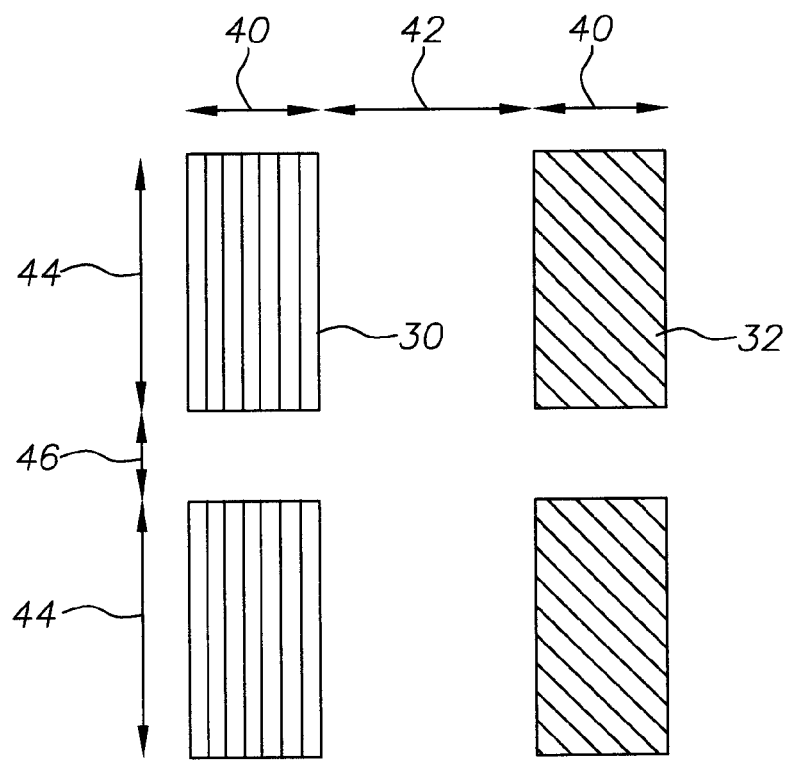
FIG. 3 is a schematic representation of light-emitting element geometries useful in understanding the present invention.

The resolution of the imager 12 relative to resolution of the OLED display is a critical factor in the present invention. Referring to FIG. 3, a schematic representation of the light-emitting element geometries of a typical OLED device includes light-emitting elements 30 and 32 arranged in columns. In an OLED display organized with each color in a column, light-emitting element 30 could be, for example, red, while light-emitting element 32 could be, for example, green. In this embodiment, the width 40 of each light-emitting element in a row of light-emitting elements is designated as characteristic width $P_W$, the separation 42 of each light-emitting element from its neighbor in a row of light-emitting elements is designated characteristic width $S_W$, the height 44 of each light-emitting element in a column of light-emitting elements is designated as characteristic height $P_H$, the separation 46 of each light-emitting element from its neighbor in a column of light-emitting elements is designated characteristic height $S_H$.

If light-emitting elements vary in width or height, or separation in either of these directions, a characteristic element width $P_W$ and separation width $S_W$, and a characteristic element height $P_H$ and separation height $S_H$ are selected, based on the element size and separation distance from an adjacent element in the relevant dimension that provides the largest ratio of the element size to separation from an adjacent element, or of separation from an adjacent element to the element size. For example, referring to FIG. 8, the separation widths between light-emitting elements are constant, while the width of element 35 is larger than that of element 37. All light-emitting element widths are larger than the separation widths, so the width of element 35 is chosen as $P_W$, as it provides the greatest ratio. Similarly, referring to FIG. 9, the light-emitting widths are constant, while the separation width 42 between adjacent light-emitting elements is smaller than the separation width 43. All light-emitting element widths are larger than the separation widths, so the separation width 42 is selected as $S_W$. Further, the separation height 47 is larger than the separation height 46, and both separation heights are smaller than the constant light-emitting element height, so the separation height 46 is selected as $S_H$.

Figure 8:
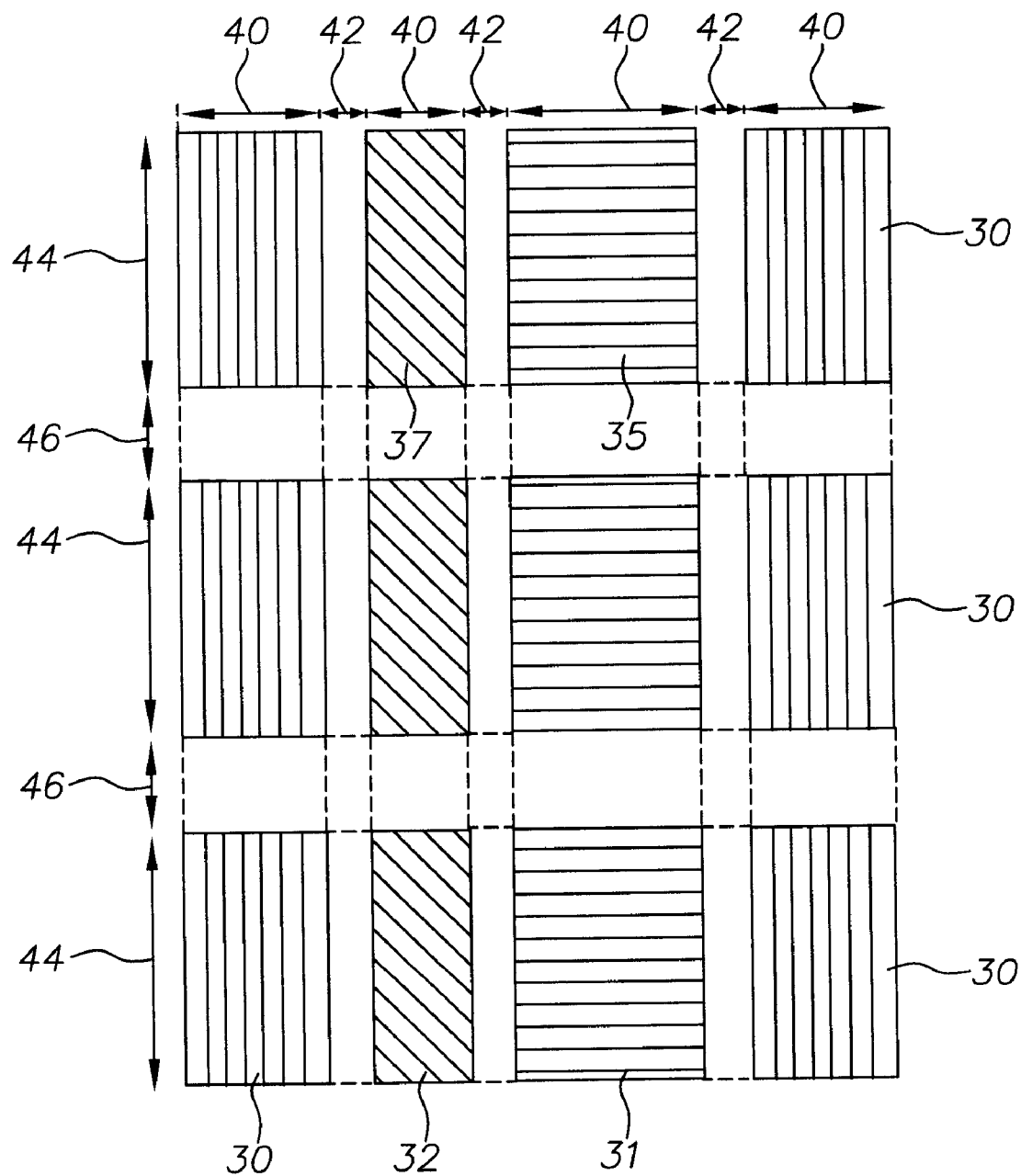
FIG. 8 is a schematic representation of alternative light-emitting element geometries useful in understanding the present invention.
Figure 9:
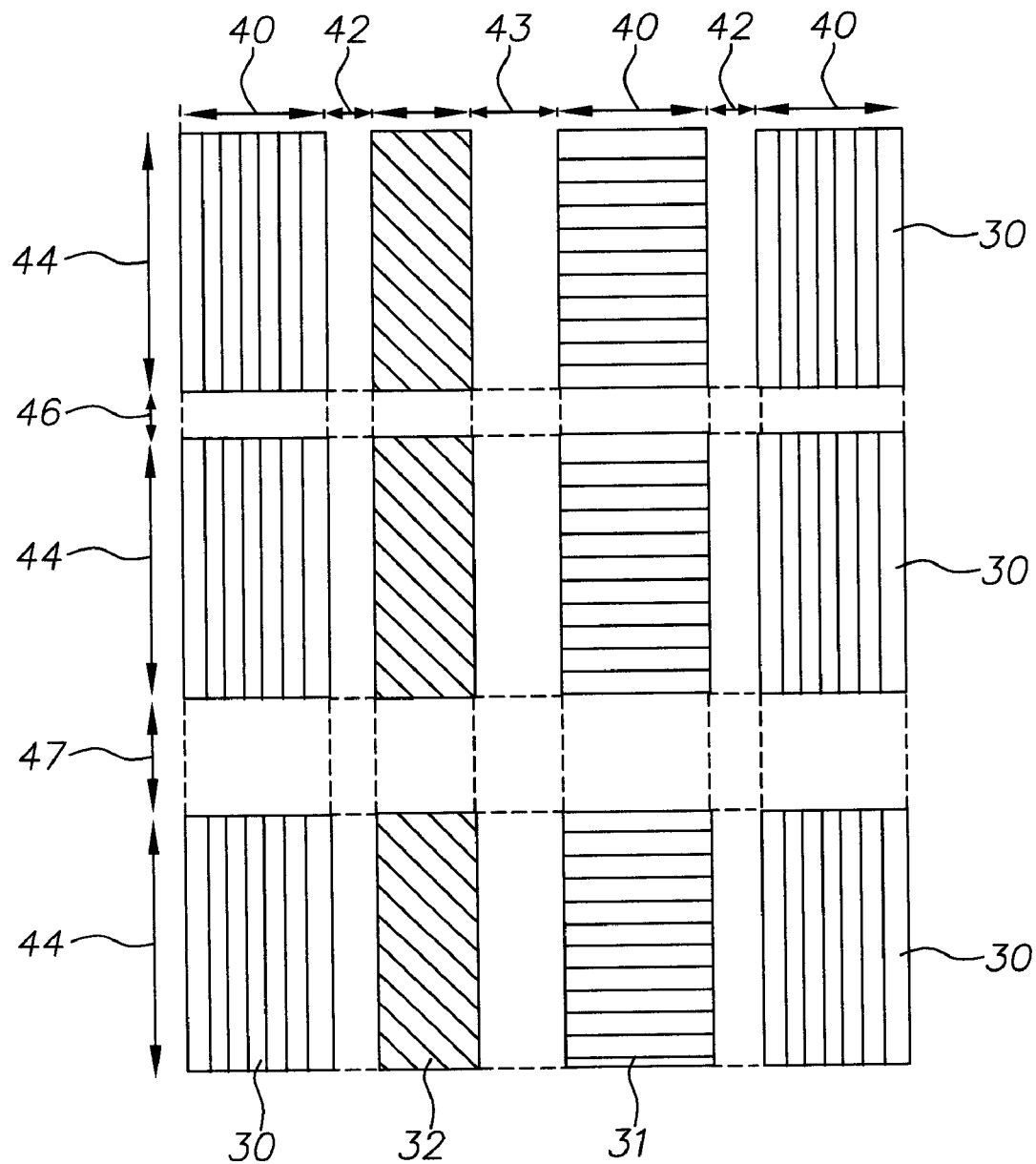
FIG. 9 is a schematic representation of alternative light-emitting element geometries useful in understanding the present invention.
Figure 10:
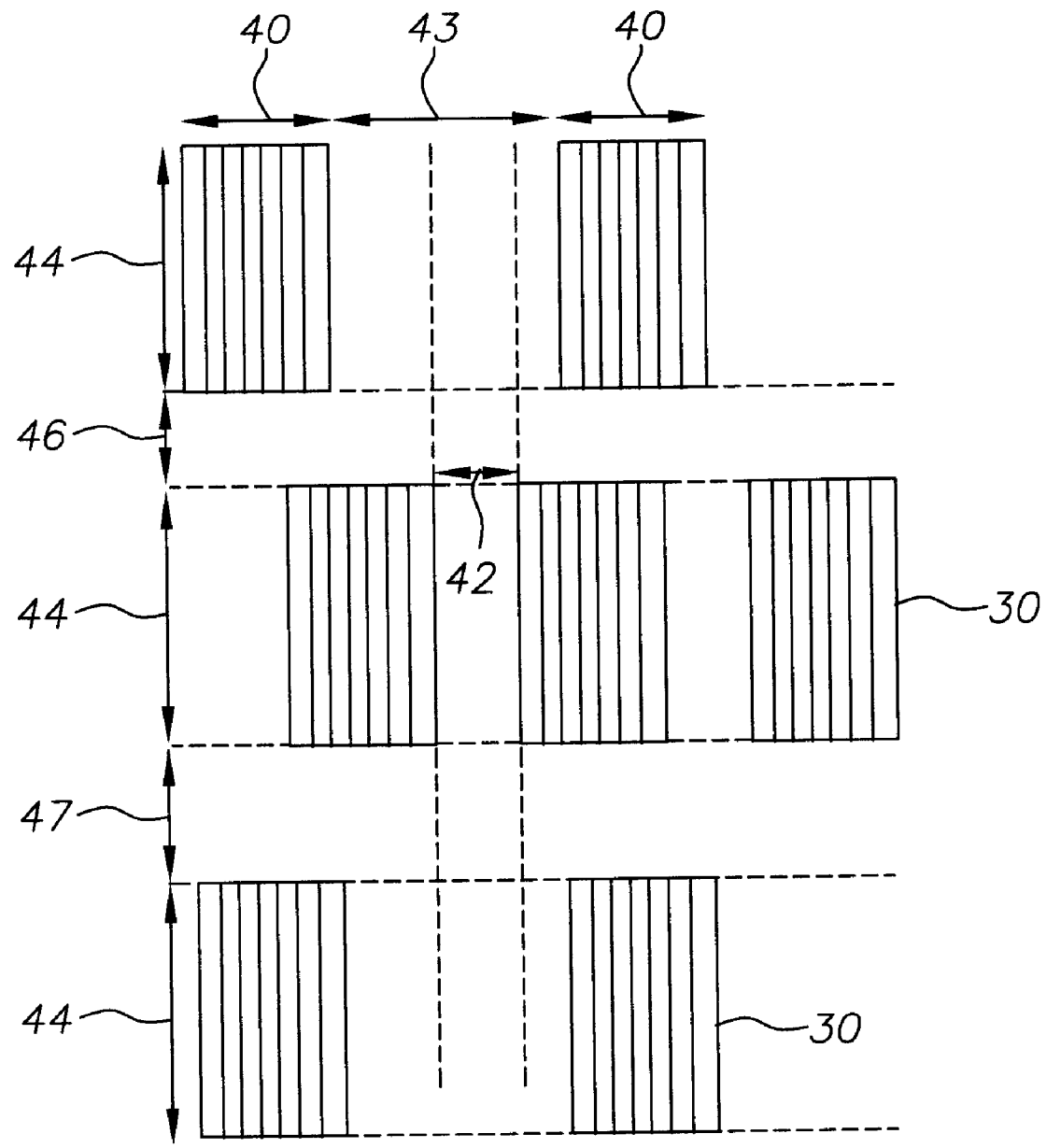
FIG. 10 is a schematic representation of alternative light-emitting element geometries useful in understanding the present invention.

Referring to FIG. 10, successive rows or columns of light-emitting elements may be out of phase. In FIG. 10, e.g., the elements in the first row are separated by a larger distance 43, while the light-emitting elements in the second row are separated by a smaller separation width 42. In this instance, the ratio of element width 40 to separation width 43 is smaller than the ratio of element width 40 to separation width 42, and separation width 42 is selected as $S_W$. As in FIG. 9, the separation height 47 is larger than the separation height 46, and both separation heights are smaller than the constant light-emitting element height, so the separation height 46 is selected as $S_H$. As the number of light-emitting elements may vary with the rows, $N_W$ is selected to represent the maximum number of light-emitting elements in any row. In FIGS. 8-10, dashed lines are used to indicate alignment of light-emitting elements.

Figure 11:
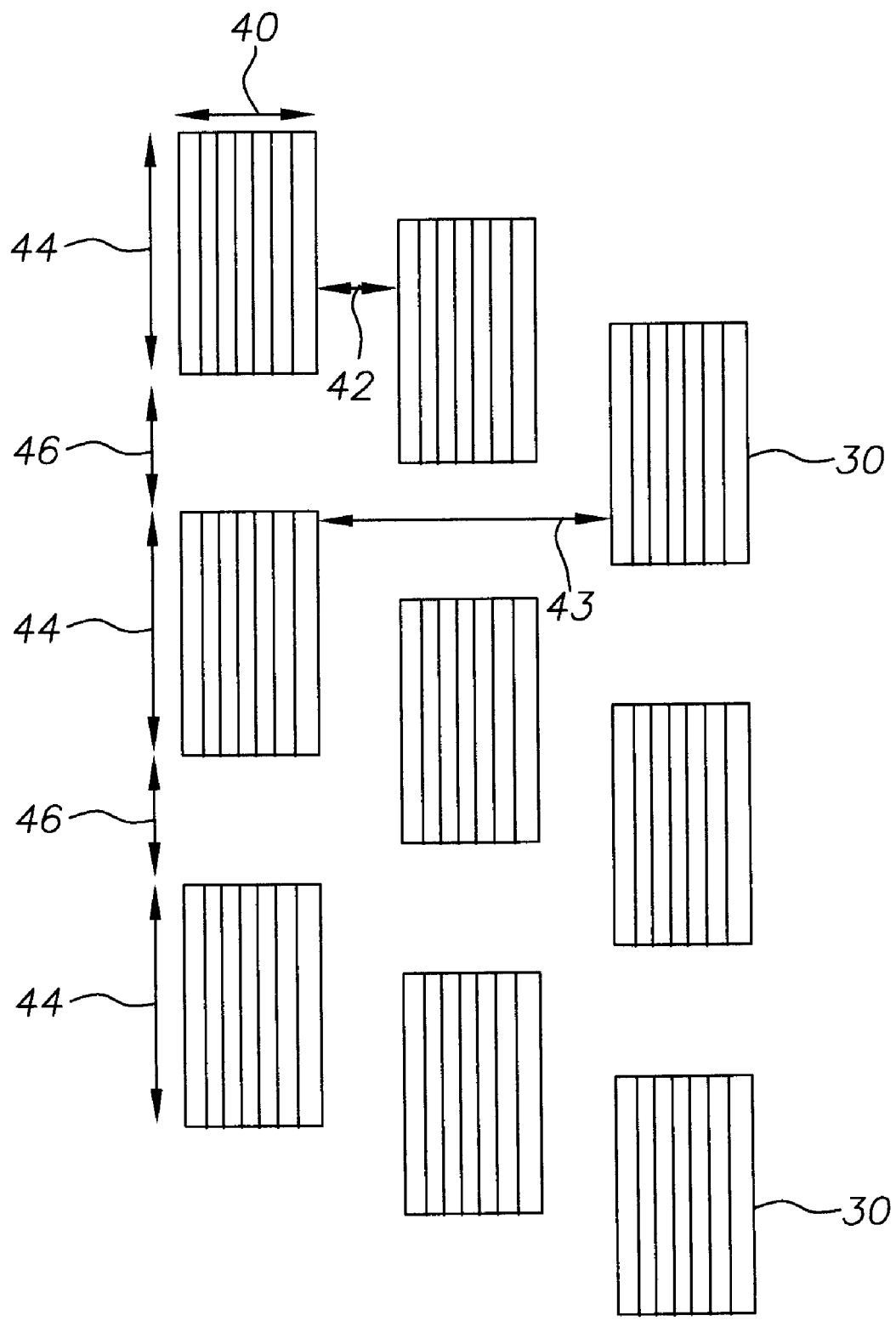
FIG. 11 is a schematic representation of alternative light-emitting element geometries useful in understanding the present invention.

Referring to FIG. 11, successive columns are shown out of phase, and have a separation height smaller than an element height. In this case, the separation between elements in a row dimension may vary, e.g., separation widths 42 and 43. As in the previous embodiments, the separation width between elements in any row which in combination with the adjacent element width provides the greatest ratio, in this embodiment 42, is selected.

Figure 4:
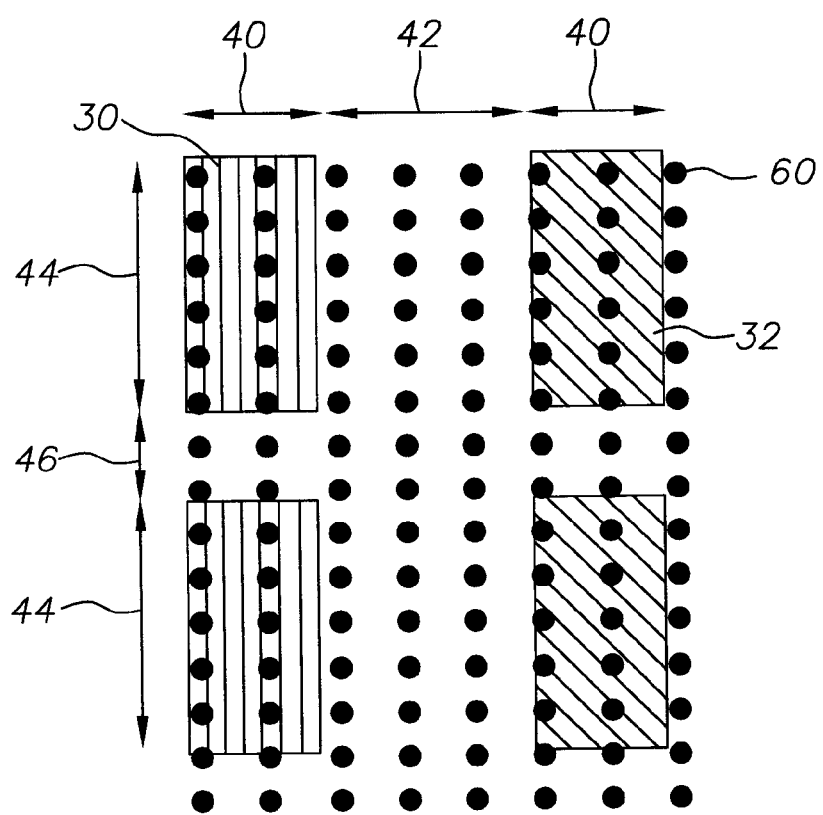
FIG. 4 is a schematic representation of light-emitting element and light-sensitive element geometries useful in understanding the present invention.

The minimum number of light-sensitive sensor elements of the imager 12 must accommodate the minimum feature size of light-emitting elements within the group in each of the dimensions. Referring to FIG. 4, an array of dots 60 is superimposed over the light-emitting elements of FIG. 3. In FIG. 4, the dots represent light-sensitive sensor elements and are shown as circles for clarity of representation. In actual practice, the "dots" will likely be rectangles that touch their neighbors and completely, or nearly completely, cover the surface of the imager.

The number of light-sensitive sensor elements in a first dimension of the imager is greater than $2(N_W-1)[(P_W+S_W)/\text{MIN}(P_W,S_W)]$, and the number of light sensitive sensor elements in a second dimension orthogonal to the first dimension of the imager is greater than $2(N_H-1)[(P_H+S_H)/\text{MIN}(P_H,S_H)]$. Effectively, this implies that the digital imager must be able to resolve the smallest of the light-emitting elements and the separation between the light-emitting elements in each dimension. Moreover, enough sensor elements must be provided to detect the light output from every light-emitting element within a group simultaneously. Since the last light-emitting element in each row or column does not have a separation gap on one side, one fewer than the total number of light-emitting elements and gaps are calculated, and the remaining light-emitting element in each row or column is detected by an additional light-sensitive sensor element. In preferred embodiments of the present invention, more light-sensitive elements are employed than the minimum number specified.

In FIG. 4, the OLED display light-emitting element width is smaller than the separation between the light-emitting elements, that is $P_W<S_W$. Therefore, the needed number of light-sensitive sensor elements in the width dimension must be greater than $2(N_W-1)[(P_W+S_W)/P_W]$. For example, if $P_W$ is 50 microns and $S_W$ is 75 microns, the number of light sensitive elements of the imager in a row must be greater than 5 times one fewer than the number of OLED display light-emitting elements in a row. The OLED display light-emitting element height is greater than the separation height. Therefore, the needed number of light sensitive imager elements in the height dimension must be greater than $2(N_H-1)[(P_H+S_H)/S_H]$. For example, if $P_H$ is 75 microns and $S_H$ is 25 microns, the number of light sensitive sensor elements of the imager in a column must be greater than 8 times one fewer than the number of OLED display light-emitting elements in a column.

As illustrated in FIGS. 1-11, the light emitting elements are rectangular in shape. Conventionally, most light emitting elements are rectangular or predominantly rectangular in shape, for example as seen in the OLED display in the Kodak LS633 camera. Predominantly rectangular shapes may include, for example, rectangles wherein a portion of the area does not emit light (e.g., to make room for electronic components or wiring connections). Alternative non-rectangular shapes are also possible, such as circles, triangles, hexagons, or other polygons. In general, regardless of shape, characteristic separation values equal the minimum separation distance between light emitting elements and characteristic size values equal the minimum feature size of the light emitting element that must be resolved.

Figure 5:
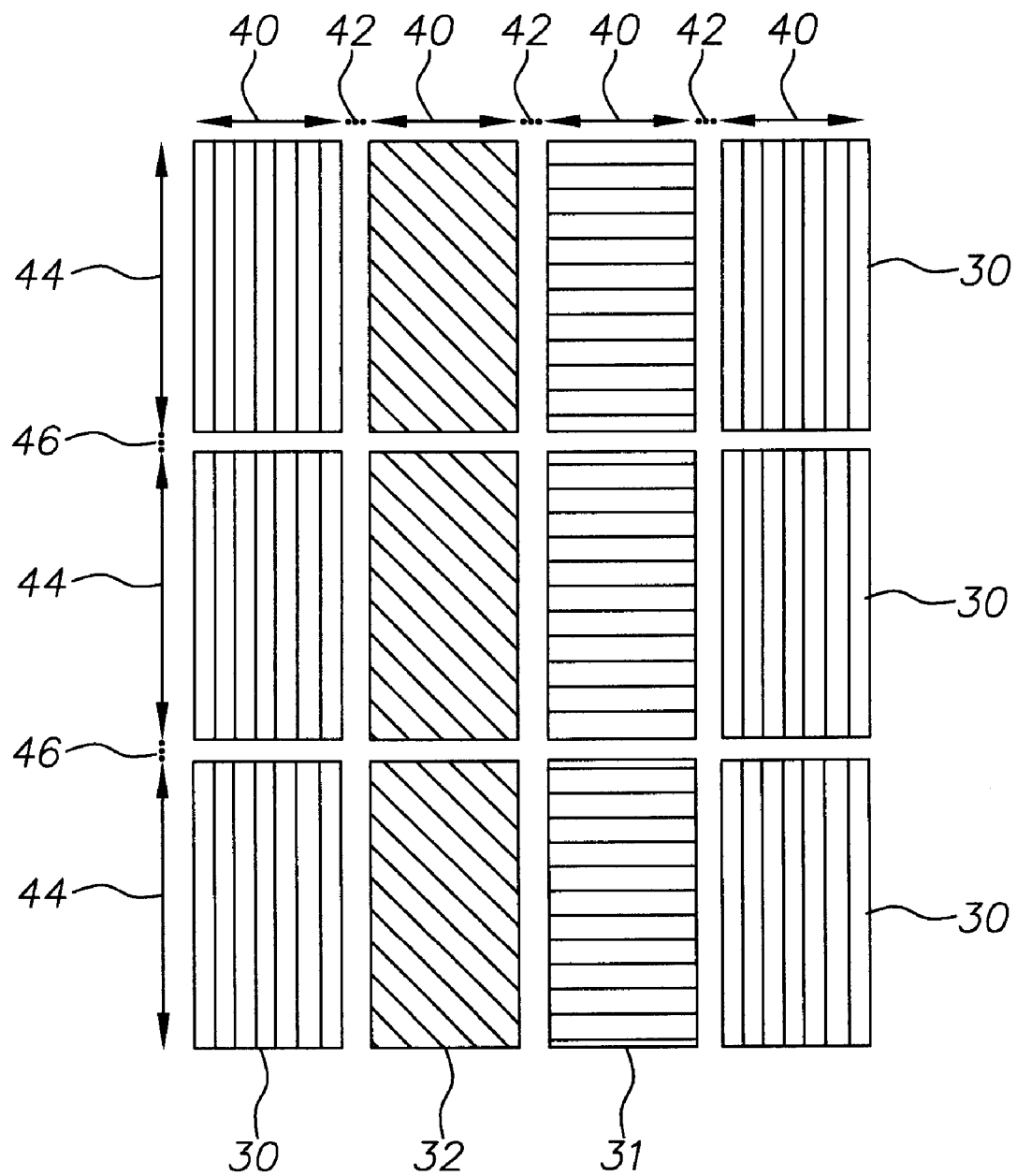
FIG. 5 is a schematic representation of alternative light-emitting element geometries useful in understanding the present invention.
Figure 6:
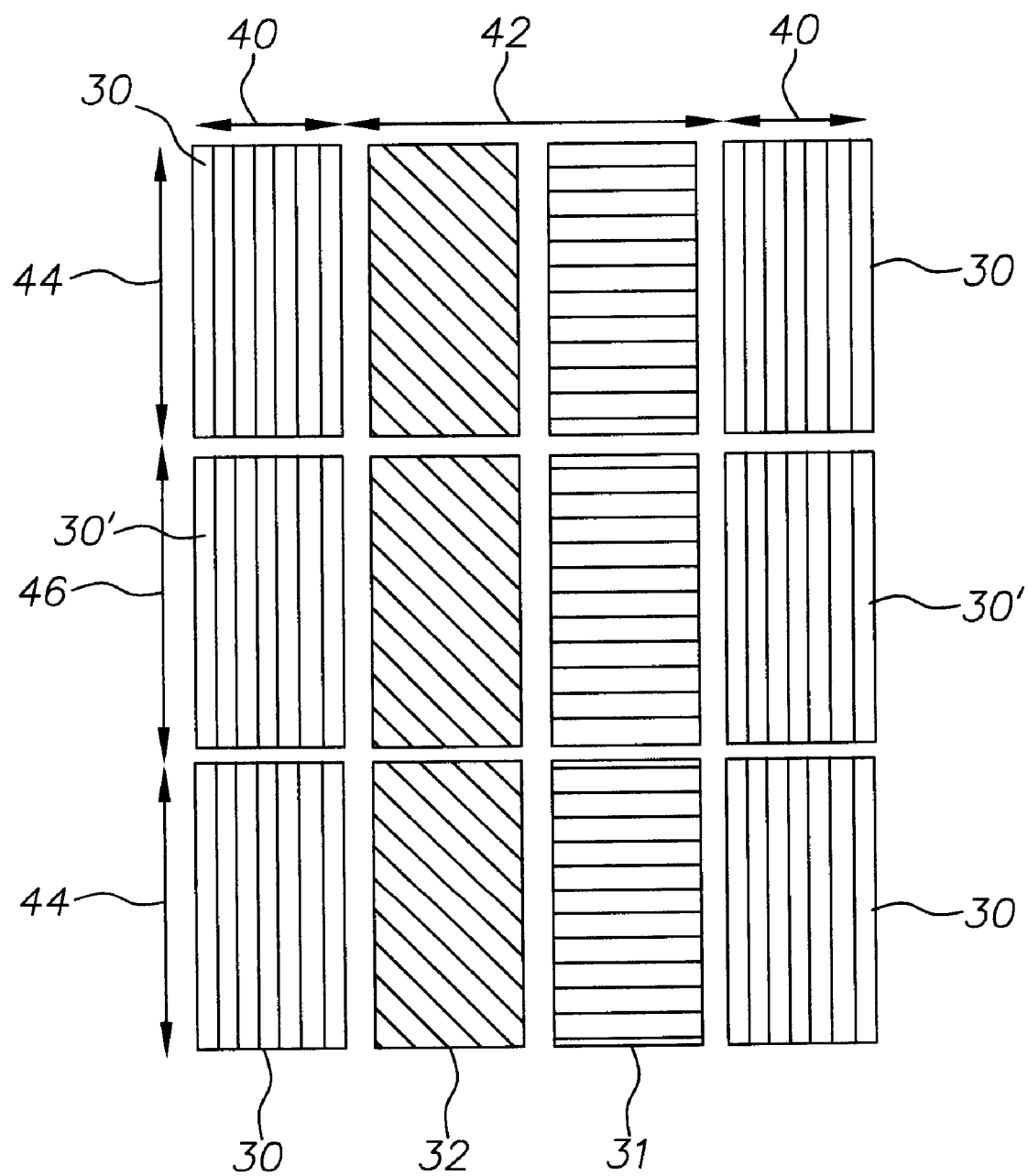
FIG. 6 is a schematic representation of alternative light-emitting element geometries useful in understanding the present invention.

In the above described embodiments, all of the light-emitting elements of the display are included in the group of elements distributed across the display for the purpose of determining the required light-sensitive element count of the imager. In further embodiments, the required light-sensitive element count of the imager may be manipulated by using the controller 14 to turn on only a subset of the light-emitting elements in the OLED display, thereby reducing the number of light-emitting elements distributed across the display that are illuminated at any one time. In such embodiments, the subset of light-emitting elements defines the group. Referring to FIGS. 5 and 6, for example, a portion of a three-color OLED display device comprising an array of multi-color elements is shown, having red 30, green 32, and blue 31 light-emitting elements arranged in columns. In each of the height and width dimensions, the separation between adjacent light-emitting elements is much smaller than the corresponding light-emitting element sizes.

In this arrangement, as shown in FIG. 5, because the relative size of the light-emitting element with respect to the separation is large, the number of light sensitive sensor elements required is relatively large when all of the light-emitting elements are simultaneously illuminated and therefore included in the group. If a larger separation between adjacent light-emitting elements included in a group can be employed, the imager element count can be reduced. For example, as shown in FIG. 6, by illuminating only four red light-emitting elements 30, the separation in both the height and width dimensions for light-emitting elements in a group is increased so that the light-emitting element size is the smaller factor, and the ratios between element size and separation in each dimension is reduced. Note also that the light-emitting element count in the group has been reduced so that the overall number of light-sensitive sensor elements required in the imager is likewise reduced. This reduction in imager light sensitive sensor element count comes at the price of requiring repeated exposures, however. In the example of FIG. 6, e.g., a second exposure for the red light-emitting elements 30' is performed followed by similar pairs of exposures for the green and blue elements 32 and 31. Therefore, the scheme illustrated in FIG. 6 requires six exposures rather than one exposure. As the light-emitting elements within each group are distributed across the display, however, the imager advantageously does not need to be repositioned relative to the display between exposures, reducing difficulties associated with integration of separate exposures into a common image for analysis and increasing the image acquisition speed of the system.

In the present invention, the imager must be arranged so that an image of the illuminated OLED display is acquired by the imager. To accomplish this goal, optical elements 13 (that may be part of the imager or may be a separate optical system) are arranged so that the light-sensitive sensor elements in the imager are exposed to all of the light-emitting elements in a group of light-emitting elements distributed across the OLED display simultaneously and at a magnification such that each light-sensitive element is exposed to no more than one OLED light-emitting element. Such an arrangement is readily accomplished with variable focus lenses, zoom lenses, or fixtures that arrange the imager and OLED display in an appropriate orientation and arrangement. Preferably, the orientation of the imager is matched to the orientation of the OLED display and the optical axis of the camera is orthogonal to, and centered on, the OLED display. The imager may be precisely focused on the surface of the display. Alternatively, Applicants have determined through experimentation that more consistent and accurate measurements with respect to actual uniformity performance between light-emitting elements may be obtained wherein optical elements are used to form a slightly defocused image of the light-emitting elements of the OLED display on the imager. Such defocusing may be particularly helpful when employing light-emitting elements having an irregular but predominantly rectangular shape (which may be used as noted above to make room for electronic components or wiring connections), or for light-emitting elements otherwise having nonuniformities within the light emitting area of a single element. Techniques for optically arranging the imager and OLED display are very well known in the art.

Once an image has been acquired the controller 14 or an external computer can process the image to extract the luminance of each light-emitting element in the OLED display. Techniques for such image processing are known in the art and can include, for example, thresholding, morphological processing, and averaging. As one example of an image processing procedure useful with the present invention, a histogram of an acquired OLED display light-emitting element image may be formed and a threshold value chosen between the two highest histogram values. Contiguous areas in the image with a value above the threshold value may be segmented to form light-emitting element groups. A variety of statistical operations may then be derived for each light-emitting element group.

In any real manufacturing system, there are variables in the manufacturing process that lead to reduced yields. In the method of the present invention, additional steps may be employed to improve the robustness of the process. Noise sources can include ambient radiation incident on the OLED display, misalignment of the OLED display and imager, imager variability, thermal variability, and OLED variability. These noise factors can be controlled with suitable process enhancements.

Figure 7:
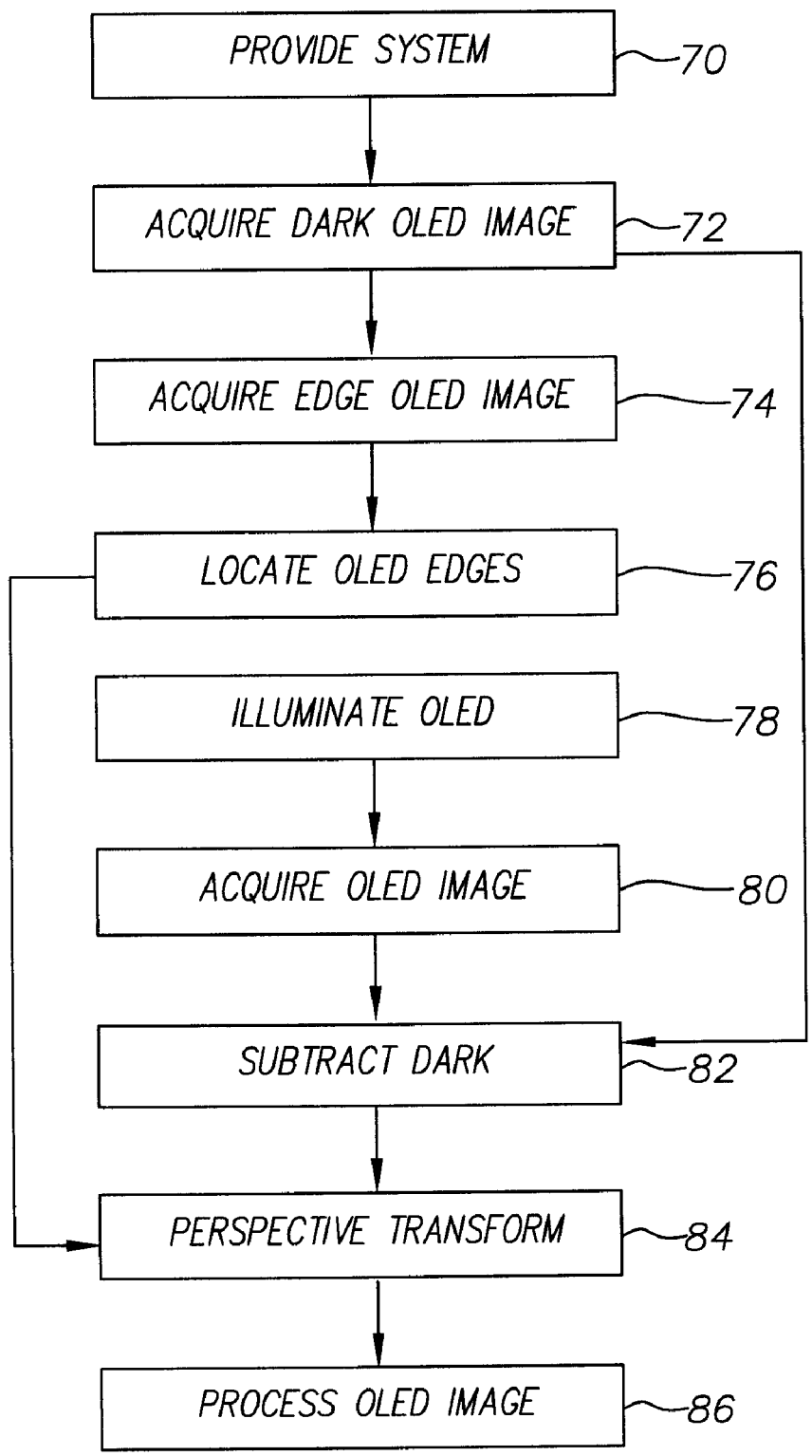
FIG. 7 is a flow diagram illustrating a method useful in the present invention.

Referring to FIG. 7, an enhanced process according to another embodiment of the present invention includes providing 70 the detection system described above. The controller then turns off all OLED light-emitting elements and acquires 72 an image of the OLED (a dark image). Subsequently, the controller turns on OLED edge light-emitting elements (for example the top and bottom row and left-most and right-most columns or the four corners) and acquires 74 a second image of the OLED (edge image). Once the edge image is acquired, the edges of the OLED can be located 76 by image processing. If the edges are not parallel, the OLED display may be misaligned with respect to the imager. In this case, a perspective transform may be performed to correct the misalignment (as described, for example in Digital Image Processing $2^{nd}$ edition by William K. Pratt, John Wiley and Sons, 1991, p. 434-441). The OLED display is illuminated 78 with a flat field at a given luminance level for all the light-emitting elements in a group to be measured. The imager then acquires 80 the flat field OLED image. The dark image is then subtracted 82 from the flat field OLED image to correct for any ambient illumination present and any imager and thermal variability in the imager. The OLED image is then corrected for any misalignment by performing a perspective transform 84. The OLED image is then processed to calculate the OLED light-emitting element characteristics.

It is known that non-uniformity in an OLED display may be dependent on the luminance of the display. According to another embodiment of the present invention, the method may be repeated at a variety of luminance levels to provide a record of display brightness and uniformity at each luminance level.

The invention has been described in detail with particular reference to certain preferred embodiments thereof, but it will be understood that variations and modifications can be effected within the spirit and scope of the invention.

PARTS LIST

10 OLED display
12 imager
13 optics
14 controller
16 light-emitting elements
20 arrange system step
22 illuminate OLED step
24 acquire image step
26 process image step
30, 30' red light-emitting element
31 blue light-emitting element
32 green light-emitting element
35 light-emitting element
37 light-emitting element
40 light-emitting element width
42 separation width 43 separation width
44 light-emitting element height
46 separation height
47 separation height
60 light sensitive element
70 provide system step
72 acquire dark image step
74 acquire edge image step
76 locate OLED edges step
78 illuminate OLED step
80 acquire OLED image step
82 subtract dark image step
84 perspective transform step
86 process OLED image step

What is claimed is:

1. A detection system for the detection of brightness and uniformity variations in a pre-defined group of light-emitting elements in an OLED display, comprising:
   a) a two-dimensional OLED display having a pre-defined group of light-emitting elements distributed across the display comprising up to $N_W$ light-emitting elements in a first dimension and up to $N_H$ light-emitting element in a second dimension orthogonal to the first dimension, each light-emitting element having a light-emitting element width and a separation width from an adjacent light-emitting element in the pre-defined group in the first dimension and a light-emitting element height and a separation height from an adjacent light-emitting element in the pre-defined group in the second dimension, wherein the light emitting elements and separations in the first dimension have a characteristic element width $P_W$ and separation width $S_W$, $P_W$ and $S_W$ being the element width and separation width from an adjacent element in the pre-defined group in the first dimension that provides the largest ratio, and the light emitting elements and separations in the second dimension have a characteristic element height $P_H$ and separation height $S_H$, $P_H$ and $S_H$ being the element height and separation height from an adjacent element in the pre-defined group in the second dimension that provides the largest ratio;
   b) a two-dimensional imager with a plurality of light-sensitive sensor elements sensitive to the light emitted by the light-emitting elements, wherein the number of light-sensitive sensor elements in a first dimension of the imager is greater than $2(N_W-1)[(P_W+S_W)/MIN(P_W, S_W)]$, and the number of light sensitive sensor elements in a second dimension orthogonal to the first dimension of the imager is greater than $2(N_H-1)[(P_H+S_H)/MIN(P_H,S_H)]$;
   c) optical elements arranged so that the imager is exposed to all of the light-emitting elements in the predefined group of light-emitting elements of the OLED display simultaneously and at a magnification such that each light-sensitive sensor element records the light output from no more than one light-emitting element; and
   d) a controller to control the OLED display and cause each of the light-emitting elements of the predefined group of light-emitting elements to illuminate and the imager to acquire images of the illuminated light-emitting elements in the OLED display.

2. A method for the measurement of brightness and uniformity variations in light-emitting elements of an OLED display, comprising the steps of:
   a) providing a detection system according to claim 1;
   b) illuminating all of the OLED display light-emitting elements within a pre-defined group distributed across the display;
   c) acquiring an image of the OLED display light-emitting elements; and
   d) processing the image of the OLED display light-emitting elements to provide a measurement of the brightness of each OLED display light-emitting element in the group.

3. The method of claim 2 further comprising the step of acquiring a dark image of the OLED display when no OLED display light-emitting elements are illuminated.

4. The method of claim 3 further comprising subtracting the dark image from the acquired image of the OLED display light-emitting elements before processing the image of the OLED display light-emitting elements.

5. The method of claim 2 further comprising the step of illuminating light-emitting elements on the edge or corner of the OLED display and performing a perspective transformation of the acquired image of the OLED display light-emitting elements before processing the image of the OLED display light-emitting elements to provide a measurement of the brightness of each OLED display light-emitting element.

6. The method of claim 2 further comprising the step of acquiring a plurality of OLED display images at a variety of light-emitting element illumination levels.

7. The method of claim 2 wherein the pre-defined group is defined by the color of light emitted by the light-emitting elements.

8. The system of claim 1 wherein the two-dimensional imager is incorporated into a digital camera.

9. The system of claim 1 wherein the light emitting elements have a variable spacing, variable size, and/or variable shape.

10. The system of claim 1 wherein the light emitting elements have a predominantly rectangular shape.

11. The system of claim 1 wherein the optical elements form a defocused image of the light-emitting elements of the OLED display on the imager.

12. The system of claim 1 wherein the optical elements form a focused image of the light-emitting elements of the OLED display on the imager.

* * * * *